United States Patent [19]

Stanley

[11] 4,386,628
[45] Jun. 7, 1983

[54] MAINTENANCE LINING OF PASSAGEWAYS

[75] Inventor: Robert K. Stanley, Media, Pa.

[73] Assignee: Pro-Tech Advisory Services Limited, Douglas, Isle of Man

[21] Appl. No.: 208,651

[22] Filed: Nov. 20, 1980

[51] Int. Cl.³ ............... F16L 55/18; E21D 11/00; B29C 27/16; B29D 27/00

[52] U.S. Cl. ............... 138/97; 138/98; 138/140; 138/149; 138/DIG. 9; 156/78; 156/287; 264/45.5; 264/45.9; 264/46.6; 264/46.9; 264/514; 264/516; 264/565; 264/173; 264/178 R; 264/209.3; 425/11

[58] Field of Search ............... 264/267, 269, 514, 516, 264/314, 209.3, 209.4, 209.5, 178 R, 46.6, 46.9, 45.9, 36; 156/71, 287, 294, 78; 138/97, 149, DIG. 9, 140; 425/11

[56] References Cited

U.S. PATENT DOCUMENTS

| | | | |
|---|---|---|---|
| 706,590 | 8/1902 | Osgood et al. | 264/46.6 X |
| 2,027,961 | 1/1936 | Currie | 264/516 X |
| 2,608,501 | 8/1952 | Kimble | 264/269 X |
| 2,794,758 | 6/1957 | Harper et al. | 156/286 |
| 3,071,162 | 1/1963 | Mick | 138/140 |
| 3,132,062 | 5/1964 | Lang et al. | 156/294 X |
| 3,230,129 | 1/1966 | Kelly | 156/287 |
| 3,372,462 | 3/1968 | Reid et al. | 138/140 X |
| 3,494,813 | 2/1970 | Lawrence et al. | 156/287 |
| 3,560,295 | 2/1971 | Kimbrell et al. | 156/287 |
| 3,662,045 | 5/1972 | Tierling | 264/516 X |
| 3,758,361 | 9/1973 | Hunter | 138/140 X |
| 3,855,376 | 12/1974 | Ono et al. | 264/46.1 |
| 3,927,164 | 12/1975 | Shimabukuro | 156/287 X |
| 3,956,438 | 5/1976 | Schippers | 264/46.1 |
| 3,985,931 | 10/1976 | Blackwelder | 264/45.9 X |
| 3,985,951 | 10/1976 | Harris | 264/46.9 X |
| 4,009,063 | 2/1977 | Wood | 264/269 X |
| 4,038,446 | 7/1977 | Rhoads | 264/45.9 X |
| 4,054,403 | 10/1977 | Hornbeck et al. | 264/45.9 X |
| 4,064,211 | 12/1977 | Wood | 264/516 |
| 4,107,247 | 8/1978 | Dukess | 264/45.9 |
| 4,207,130 | 6/1980 | Barber | 264/267 X |
| 4,221,624 | 9/1980 | Eslinger et al. | 264/45.9 X |
| 4,252,755 | 2/1981 | Normanton et al. | 264/45.9 |

FOREIGN PATENT DOCUMENTS

| | | | |
|---|---|---|---|
| 738952 | 7/1966 | Canada | 156/287 |
| 1479813 | 5/1969 | Fed. Rep. of Germany | 264/269 |
| 39-2071 | 2/1964 | Japan | 264/45.9 |
| 53-3782 | 2/1978 | Japan | 264/45.9 |
| 54-1752 | 1/1979 | Japan | 264/269 |
| 54-4971 | 1/1979 | Japan | 156/294 |
| 54-152078 | 11/1979 | Japan | 156/294 |
| 55-34969 | 3/1980 | Japan | 156/294 |
| 55-49225 | 4/1980 | Japan | 156/294 |
| 711771 | 7/1954 | United Kingdom | 264/46.6 |
| 954069 | 4/1964 | United Kingdom | 264/45.9 |
| 210719 | 3/1968 | U.S.S.R. | 156/294 |
| 341996 | 1/1970 | U.S.S.R. | 264/46.6 |

*Primary Examiner*—Philip E. Anderson
*Attorney, Agent, or Firm*—Charles A. McClure

[57] ABSTRACT

A sewer pipe, transport pipeline, or other circumferentially enclosed passageway is lined by inserting into and along it a flexible tubular material of given diameter, with its corresponding circumference being less than the inside perimeter of the passageway. The tubular material is a laminate having a dimensionally stable skin layer facing the interior of the passageway and a contiguous layer of a composition foamable to form an expanded cellular structure. After insertion of the tubular material the contiguous layer is foamed to expand cellularly so as to fill the space between the inner skin and the inside wall of the passageway and to solidify in place. The tubular material may have an expansible outer skin layer also.

17 Claims, 7 Drawing Figures

MAINTENANCE LINING OF PASSAGEWAYS

This invention relates to lining of sewer pipes, transport pipelines, or other circumferentially enclosed passageways, especially after installation on-site, so as to preclude leakage of the contents to the exterior or incursion of external substances thereinto.

Materials and methods are known for lining passageways with flexible materials (e.g., Harper et al. U.S. Pat. No. 2,794,758), which may be rigidifiable in place (e.g., Lang U.S. Pat. No. 3,132,062 and Wood U.S. Pat. No. 4,009,063). However, getting the liner to fit the passageway is difficult because for ready insertion the liner must be smaller than the passageway. Pressurizing the liner with air or water to expand it so as to fit the passageway risks rupturing the liner, either through an aneurism or through a puncture from contact with an irregularity in the interior wall of the passageway. A leaky liner is likely to deteriorate further by interchange of materials with the exterior through its ruptured portion(s).

A primary object of the present invention is leakproof lining of passageways.

Another object of this invention is adaptation of a passageway lining to irregularities in the interior wall of the passageway.

A further object of the invention is provision of a laminated lining material suited to accomplishing the foregoing objects.

Other objects of this invention, together with means and methods for attaining the various objects, will be apparent from the accompanying drawings and the following description of certain embodiments thereof, which are presented by way of example rather than limitation.

In general, the objects of the present invention are accomplished, in the lining of a passageway, by means of a flexible lining material having a given diameter, with its corresponding circumference being less than the internal perimeter of the passageway. More particularly, the liner is laminated, having a dimensionally stable skin layer and a contiguous layer of foamable and solidifiable composition. The liner optionally has also an expansible skin layer, thereby sandwiching the foamable layer between skin layers. The liner is inserted into and along the passageway so that the dimensionally stable skin layer faces the interior of the passageway, and it is held open to its given diameter by internal pressurization with suitable fluid. Then the foamable layer is foamed, as through chemical generation of gas bubbles therein occurring upon heating by such fluid, whereupon it expands into cellular configuration (expanding the outer skin layer, if present) and fills the space between the inner skin layer and the wall of the passageway, then solidifies in place. The present specification discloses apparatus for facilitating the foregoing operations, beginning and resulting materials, and preferred operating procedures.

Figure 1:
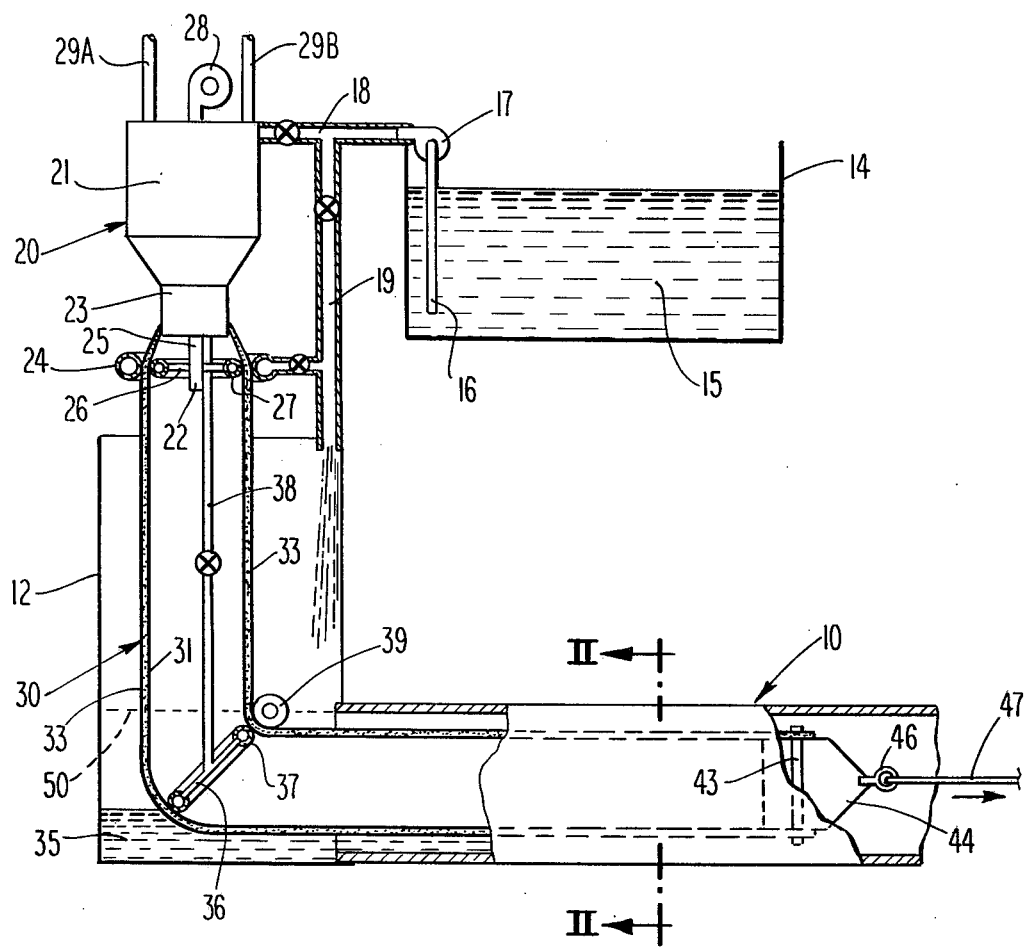
FIG. 1 is a side elevation, partly in section, of a pipe receiving a first embodiment of lining material according to this invention.
Figures 2, 3:
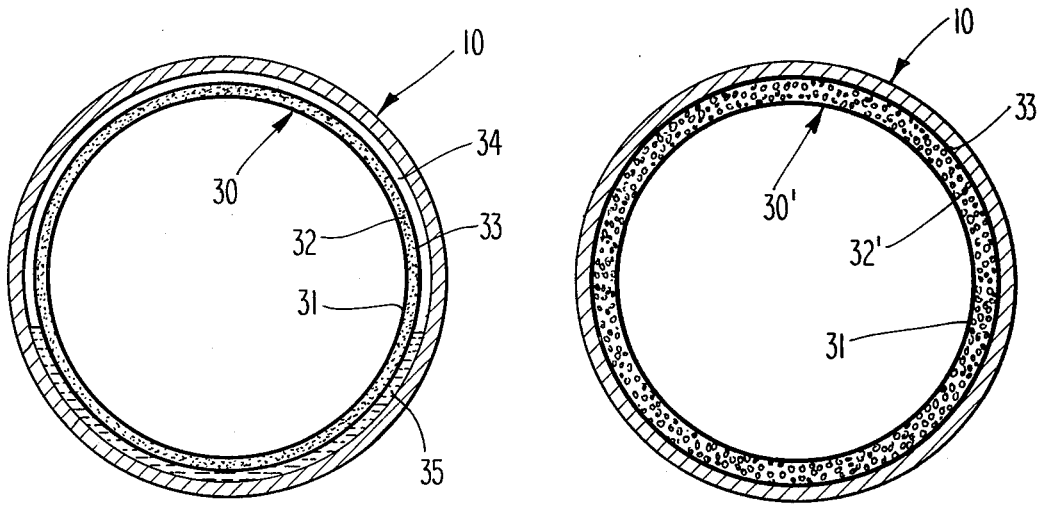
FIG. 2 is a sectional end elevation of the pipe and lining material of FIG. 1 taken at II—II thereon.
FIG. 3 is a view similar to FIG. 2 after completion of the pipe lining.

FIGS. 1 to 3 illustrate the practice of a first embodiment of the invention with a 3-component tubular lining material. FIG. 1 shows in side elevation, partly cutaway and largely schematically, pipe 10 together with apparatus and materials for lining it. At the left end of the pipe is open-topped enclosure 12 fitting thereto and extending to a higher level; it may be an access chimney, manhole, tank or the like depending upon type and location of the pipe or other passageway to be lined. Tank 14 containing liquid 15 (usually water) has pump 17 withdrawing such liquid through intake pipe 16 and discharging it through pipe 18, which connects through piping concealed in the extruder housing to extension pipe 38 and directly into outlet 19 into enclosure 12 for reasons discussed below.

FIG. 1 also shows extruder 20, which has fixed base 21 suitably supported over enclosure 12 with extruding head 23 oriented downward toward the enclosure. Extending further downward concentric with the head is hollow support 25 for spider 26, which carries hollow toroidal inner ring 27 (shown sectioned). On the base at the opposite (upper) end of the central axis of the extruder is air pump 28, with its intake open to the atmosphere, which discharges through the open end of hollow support 25. The base has inlet pipes 29A and 29B for separate feed materials, which may be polymer and blowing agent, or may be skin polymer and dissimilar foamable polymeric composition, for example.

Also shown in FIG. 1 is tubing 30 (shown in section) being formed on the extruder head and withdrawn therefrom partly by gravity and partly by withdrawal force applied to its end in the pipe. The leading edge of the tubing in the pipe is retained by strap 43 around block 44, which has eye 46 fastened to cable 47 being pulled to the right as indicated by an arrow. Water 35 in the bottom of the pipe lubricates and buoys up the tubing. Alternative (higher) water level 50 appears in broken lines. The tubing is opened to the desired given diameter by passage over the upper inner ring 27, to which is juxtaposed hollow outer ring 24 with the tubing therebetween. The tubing is drawn vertically downward into enclosure 12 while being held open by injection of air (which may contain water vapor) from the open end of hollow support 25 provided thereto by pump 28. The tubing passes under idler roller 39 near the bottom of the enclosure around hollow second ring 37, which is canted, and then horizontally into pipe 10.

Respective upper and lower inner rings 27 and 37 are supported on spiders 26 and 36, the former directly on hollow nose tube 22 of the extruder head, and the latter on extension tube 38, which communicates through the extruder head with an upper branch line of pipe 18. The extension tube extends downward from the head and alongside the nose tube to pipe 10 axis level. Upper outer ring 24 is supported in communication with pipe 18 on a lower side branch thereof. All three rings, being hollow, are supplied with water internally through their hollow supporting means. Each ring has small peripheral openings so as to wet the adjacent surface of the plastic tube and thereby facilitate its passage over the ring surface. At upper rings 24 and 27 the wetting performs the additional function of quenching the hot tubing and thereby rendering it dimensionally stable, the skin permanently and the expansible contiguous layer temporarily. Upper inner ring 27 performs the additional function of opening (or sizing) to the given diameter the as yet dimensionally unstable tubing which the quenching then stabilizes.

FIG. 2 shows, on an enlarged scale, the resulting cross-sectional appearance of the tubular lining material inside the pipe. Tubing 30 is seen to be a 3-component laminate with inner skin 31, outer skin 33, and contiguous layer 32 of foamable composition (shown stippled) sandwiched by the skin layers. The annular space between the outer skin of the tubing and the inside wall of the pipe is occupied by water 35 in the lower portion and by air 34 in the upper portion. When the tubing has been pulled to the other end (not shown) or other accessible intermediate part of the length of pipe, the pulling and the extrusion are stopped. Then the water is raised to alternative level 50 and is heated to cause the foam composition to expand, as explained more fully below, with or without heating of the air.

FIG. 3 shows similarly the cross-sectional appearance of the resulting lined pipe. Previous contiguous layer 32 of foamable composition (stippled) has expanded to force outer skin 33 against the inside wall of the pipe, and the resulting cellular layer (shown with small circles throughout) is designated 32' for clarity. The former annular space partly occupied by water and partly by air is completely absent. Solidification in the expanded cellular configuration provides a permanent in-place liner 30' for the pipe.

Figure 4:
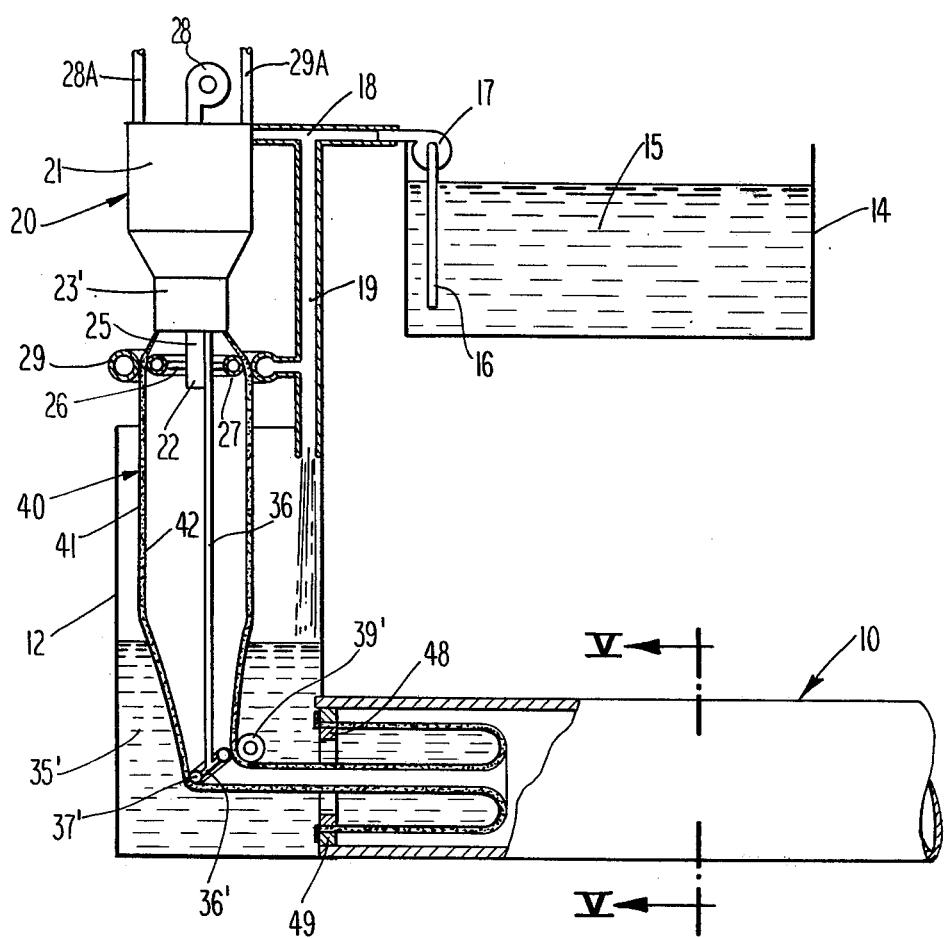
FIG. 4 is a side elevation with partial sectioning similar to FIG. 1 but showing the pipe receiving a second embodiment of lining material.
Figures 5, 6:
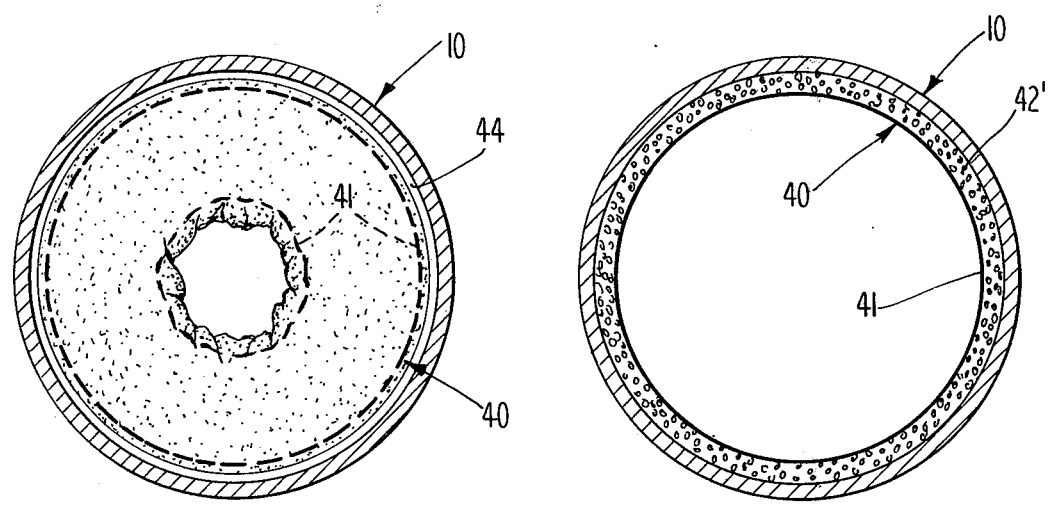
FIG. 5 is a sectional end elevation corresponding to the side elevation of FIG. 4, taken at V—V thereon.
FIG. 6 is a view bearing a like relation to FIG. 5 as FIG. 3 does to FIG. 2.

FIGS. 4, 5, and 6 similarly illustrate practice of another embodiment of this invention with a 2-component tubular lining material, lacking one of the skin layers. Most of the illustrated features are identical with those of the preceding views and accordingly are identified with unchanged reference numerals whereas new features are designated by new numerals. For clarity the tubing of this embodiment and its component layers are given numbers different from those of the first embodiment (higher by 10).

FIG. 4 shows pipe 10, extruder 20, and enclosure 12 and tank 14 and related features essentially unchanged, except that smaller canted ring 37' replaces the previous one, and roller 38' is relocated accordingly relative to the location of roller 39 before. Tubing 40 of this embodiment is produced on modified extruder head 23' with skin layer 41 on the outside (whereas skin layer 31 was on the inside of tubing 30 of the previous embodiment) and with contiguous layer 42 of foamable composition (represented by stippling) on its inside face. Water 35' is maintained in enclosure 12 at a level above the top edge of the pipe, and the tubing collapses from the water pressure outside as it passes below the surface, over small canted ring 37' and below idler roll 39'. The leading edge of the tubing is secured by compression between respective inner and outer rings 48 and 49, the latter of which fits tightly within the open end of the pipe and seals the tubing to it. As the tubing is extruded, the water forces it into and along the pipe, turning the tubing inside out (i.e., "everting" it) in so doing.

FIG. 5 shows the appearance of entering tubing 40 at the indicated cross-section of pipe 10. Visible throughout most of this view of the pipe interior is layer 42 of foamable composition, which is being everted from the inside to the outside of the tubing. Annular space between the tubing and the pipe is filled by air 44 (ring 48 is too far from the plane of the view to show here). Skin layer 41, being behind contiguous layer 42, is shown in broken lines to locate it for the viewer; it is a narrow everting surface as two adjacent lengths of the skin layer bend through a sharp direction reversal. After the pipe is filled with the tubing, the water is heated or is replaced with heated water so as to expand the foamable layer into cellular configuration and solidify it in place against the inside wall of the pipe, taking care not to let water intrude.

FIG. 6 shows the resulting cross-sectional appearance. Foamed layer 42' of resulting lining 40' occupies all the space between inner skin 41 and the pipe wall, there being no outer skin.

Figure 7:
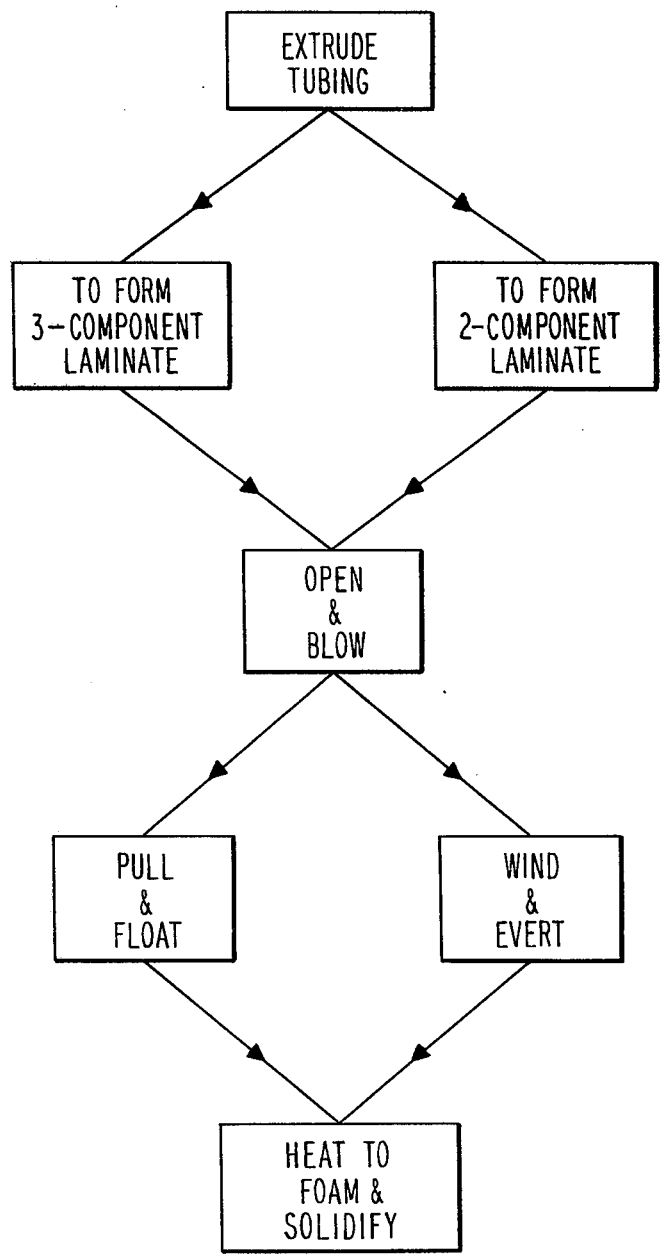
FIG. 7 is a schematic or block diagram summarizing the showings of the preceding views.

FIG. 7 summarizes the previous disclosure by sequence of steps. The steps unique to the first described embodiment are at the left; those unique to the second embodiment are at the right; and those steps common to both embodiments are in a center column. Thus, to practice the first embodiment, extrude polymeric material to form 3-component laminate, open the tubing and blow to keep it open, pull and float it into and along the pipe, and heat it to expand the foamable layer and solidify it in cellular form. Alternatively, to practice the second embodiment, extrude polymeric material to form 2-component tubing, open the tubing and blow to keep it open until winding it, and evert it (with water pressure) into and along the pipe, then heat it to expand the foamable layer and solidify it in cellular configuration.

For convenience the extruder and the tank of water (or equivalent means for supplying water, such as hose for connection to a spigot) may be hauled in a truck—together with a portable enclosure for the end of the pipe if above ground. The extruder will be of known type with multiple ringlike orifices capable of extruding multiple layers to form laminated tubing, as is well known in that art. Not shown is equipment for storing pellets of polymer and for heating them into a melt, as may occur at or close to the extruder itself, as these well known features form no part of the present invention.

The inner skin layer is dimensionally stable so that it remains at essentially unchanged diameter (when fully open, of course) throughout the lining operation. In the embodiment with an outer skin layer, expansibility thereof is ensured by making it thin relative to the inner skin layer, by heating it to a higher temperature than the inner skin layer attains, making it of a more elastomeric polymer, or any combination of such variations.

Suitable polymer compositions for forming the skin layer(s) include vinyl polymers, polyhydrocarbons, such as polypropylene; polyesters, such as polyethylene terephalate; polyamides, such as 6-nylon and 66-nylon; and polyurethanes. The foamable composition should be compatible therewith and may comprise the same or different polymers (e.g., a copolymer of vinyl chloride and vinylidene chloride) having admixed therewith a heat-actuated blowing agent, perhaps together with a catalyst of little activity at temperatures below about 100° F. An example of a suitable oxygen-producing agent (under alkaline conditions) is benzoyl peroxide; examples of agents capable of generating carbon dioxide (under acid conditions) include carbonates and polycarbonates.

A most important aspect of this invention to practice is proper temperature control to form the desired laminated tubing in the first place, to be sufficiently self-supporting but flexible in the second place, without activating the blowing agent too soon. However, every lining job on-site is sufficiently different that experience is the best teacher, and persons ordinarily skilled in the art will quickly acquire the skill and expertise desired for a smooth and economical job, resulting in installation of a long-lasting plastic liner. Such a liner not only will prevent deterioration of the pipe wall but will repair cracks and minor breaks without necessity for digging up the pipe if underground or entering it wherever located. An adhesive outer surface, either characteristic of the polymeric material employed or suitably added thereto, will promote adhesion to the inner wall of the pipe being lined, while flow into or around irregularities of the pipe wall during expansion of the material will bond the liner to the wall mechanically.

Notwithstanding the illustration and description of certain embodiments of the present invention, modifications may be made therein, as by adding, combining, or subdividing parts or steps, or by substituting equivalents, while maintaining all or some of the advantages and benefits of this invention, which itself is defined in the following claims.

The claimed invention:

1. In interlining a pipe, conduit or otherwise rigid passageway with tubular material and thereby maintaining the passageway, the improvement comprising providing flexible tubing having a dimensionally stable skin layer and having a contiguous expansible layer, inserting the tubing into and along the passageway with the dimensionally stable layer on the inside of the tubing, holding the tubing open by fluid inside, and foaming and thereby expanding the contiguous layer to enlarge the outside surface of the tubing into circumferential contact with an inside wall of the passageway.

2. Passageway lining method according to claim 1, wherein the contiguous layer, spaced adjacent the passageway wall, is foamed into expanded cellular configuration.

3. Passageway lining method according to claim 1 or 2, wherein the expanded contiguous layer is solidified in place.

4. Passageway lining method according to claim 1, wherein the expanded contiguous layer is solidified in place.

5. Passageway lining method according to claim 2, having the expanded contiguous layer constituting the outside surface of the tubing in direct contact with the inside wall of the passageway.

6. Passageway lining method according to claim 2, having an expanded outer skin layer on the outside surface of the tubing between the expanded contiguous layer and the insdie wall of the passageway.

7. Method of interlining a pipe defining a passageway and thereby maintaining it, comprising forcibly opening up to a given diameter a flexible multi-layered tubing having a dimensionally stable skin layer and a contiguous expansible layer, inserting the tubing into and along the pipe, with the dimensionally stable layer on the inside of the tubing, and foaming and thereby expanding the contiguous layer and so enlarging the outside surface of the tubing into circumferential contact with the inside wall of the pipe wherein the contiguous layer is originally on the inside of the tubing, and including sealing the leading end of the tubing to the near end of the pipe and everting the tubing into and along the pipe by applying fluid pressure to the dimensionally stable skin layer, which was originally on the outside of the tubing, so as to place such skin layer on the inside of the tubing in the pipe and expose the contiguous layer on the outside of the tubing spaced adjacent the inside wall of the pipe against which it is subsequently expanded.

8. Method of interlining and thereby maintaining a passageway, comprising the steps of extruding a composite tubing having a skin layer inside and having a foamable layer contiguous therewith, dimensioning and quenching the tubing against a cooled ring substantially concurrently with the extrusion step to such a circumferential size as to be juxtaposable to but spaced apart from the inside wall of the passageway, inserting the tubing longitudinally into and along the passageway and thereby juxtaposing the tubing to such passageway wall, then foaming the foamable layer and thereby expanding it to enlarge the outer dimension of the tubing and eliminate the spacing of the tubing from the wall.

9. Method of lining and thereby maintaining a subterranean sewer or water pipe or conduit having at least one of its ends open and accessible from ground level, comprising the steps of extruding at substantially ground level flexible tubing having a foamable layer and an adjacent dimensionally stable skin layer passing the tubing downward into the pipe or conduit and along the inside wall thereof, supporting the tubing adjacent thereto by fluid but spaced substantially uniformly apart therefrom, and foaming the foamable layer and thereby enlarging the adjacent surface of the tubing into contact with the wall of the pipe or conduit.

10. Pipe or conduit lining method according to claim 9, including dimensioning the tubing against a quenching ring upon extrusion to fit the pipe or conduit being lined.

11. Pipe or conduit lining method according to claim 8, wherein a dimensionally stable skin is formed on the inside of the tubing, and the leading end of the resulting tubing is then pulled into and along the pipe or conduit.

12. Pipe or conduit lining method according to claim 11, wherein the tubing is floated in the pipe or conduit on a thin layer of water lying along the invert thereof.

13. Pipe or conduit lining method according to claim 12, wherein the tubing is formed with an expansible outer layer or skin.

14. Pipe or conduit lining method according to claim 8, wherein a dimensionally stable skin is formed on the outside of the tubing, the leading end of the resulting tubing is secured to the end of the pipe or conduit, and the tubing is everted into and along the pipe or conduit by water applied against the dimensionally stable skin, which accordingly ends up on the inside surface of the tubing in place in the pipe or conduit.

15. Subterranean sewer or water pipe or conduit maintained by being lined while in place with a tubular laminate having an inside skin and a cellular contiguous layer expanded by foaming in situ, the outside surface of the laminate thereby being forced outward into contact with the inside wall of the pipe or conduit over essentially the entire surface thereof.

16. Subterranean sewer or water pipe or conduit lined according to claim 15, wherein the outer surface of the laminate is adherent to the inside wall of the pipe or conduit.

17. Subterranean sewer or water pipe or conduit maintained by being lined in place according to the method of claim 9.

* * * * *